United States Patent
Jayanthi

(10) Patent No.: US 11,609,928 B2
(45) Date of Patent: Mar. 21, 2023

(54) SYSTEMS AND METHODS OF DETERMINING TARGET DATABASE FOR REPLICATION OF TENANT DATA

(71) Applicant: salesforce.com, inc., San Francisco, CA (US)

(72) Inventor: Swaroop Jayanthi, Hyderbad (IN)

(73) Assignee: Salesforce, Inc., San Francisco, CA (US)

( * ) Notice: Subject to any disclaimer, the term of this patent is extended or adjusted under 35 U.S.C. 154(b) by 109 days.

(21) Appl. No.: 16/548,937

(22) Filed: Aug. 23, 2019

(65) Prior Publication Data

US 2021/0056121 A1  Feb. 25, 2021

(51) Int. Cl.
| | |
|---|---|
| G06F 16/00 | (2019.01) |
| G06F 16/27 | (2019.01) |
| G06F 16/9035 | (2019.01) |
| G06K 9/62 | (2022.01) |
| G06F 16/215 | (2019.01) |

(52) U.S. Cl.
CPC ............ *G06F 16/27* (2019.01); *G06F 16/215* (2019.01); *G06F 16/9035* (2019.01); *G06K 9/6267* (2013.01)

(58) Field of Classification Search
CPC ..... G06F 16/27; G06F 16/215; G06F 16/9035
See application file for complete search history.

(56) References Cited

U.S. PATENT DOCUMENTS

| | | | | |
|---|---|---|---|---|
| 2009/0282090 | A1* | 11/2009 | Hamilton, II | G06F 16/00 |
| 2014/0324774 | A1* | 10/2014 | Chen | G06F 16/1844 |
| | | | | 707/611 |
| 2015/0261838 | A1* | 9/2015 | Cadarette | G06F 16/2282 |
| | | | | 707/634 |
| 2017/0070464 | A1* | 3/2017 | Willis | H04L 51/22 |
| 2018/0137015 | A1* | 5/2018 | Boshev | G06F 21/602 |
| 2020/0104375 | A1* | 4/2020 | Earnesty, Jr. | G06F 11/3065 |
| 2020/0285984 | A1* | 9/2020 | Bejjam | G06N 7/005 |
| 2020/0287814 | A1* | 9/2020 | Zhao | G06N 3/0481 |

* cited by examiner

*Primary Examiner* — Khanh B Pham
(74) *Attorney, Agent, or Firm* — Butzel Long

(57) ABSTRACT

Systems and methods are provided for retrieving a source database replication configuration profile that is used to determine one or more databases of a plurality of target databases to store selected tenant data of a source database to be replicated, retrieving from each the plurality of target databases a target database replication configuration profile and transforming the profiles to persist in a management platform database, comparing the retrieved source database replication configuration profile and the target database replication configuration profiles to determine which target databases are usable to replicate the selected tenant data to, classifying the target database replication configuration profiles based on results of the comparison, and generating a list of one or more target databases of the plurality of target databases for the selected tenant data of the source database to be replicated to based on the classification of the target database replication configuration profiles.

18 Claims, 7 Drawing Sheets

FIG. 1A

110: Retrieve, at a server of a management platform service, a source database replication configuration profile that is used to determine one or more databases of a plurality of target databases to store selected tenant data of a source database to be replicated

120: Retrieve, at the server of the management platform service from each the plurality of target databases, a target database replication configuration profile

130: Transform, at the server of the management platform service, the retrieved target database replication configuration profiles to persist in a management platform database that is communicatively coupled to the server of the platform management service

140: Compare, at the server of the management platform service, the retrieved source database replication configuration profile and the target database replication configuration profiles to determine which target databases are usable to replicate the selected tenant data to

150: Classify, at the server of the management platform service, the target database replication configuration profiles based on results of the comparison of the source database replication configuration profile and the target database replication configuration profiles

160: Generate, at the server of the management platform service, a list of one or more target databases of the plurality of target databases for the selected tenant data of the source database to be replicated to based on the classification of the target database replication configuration profiles

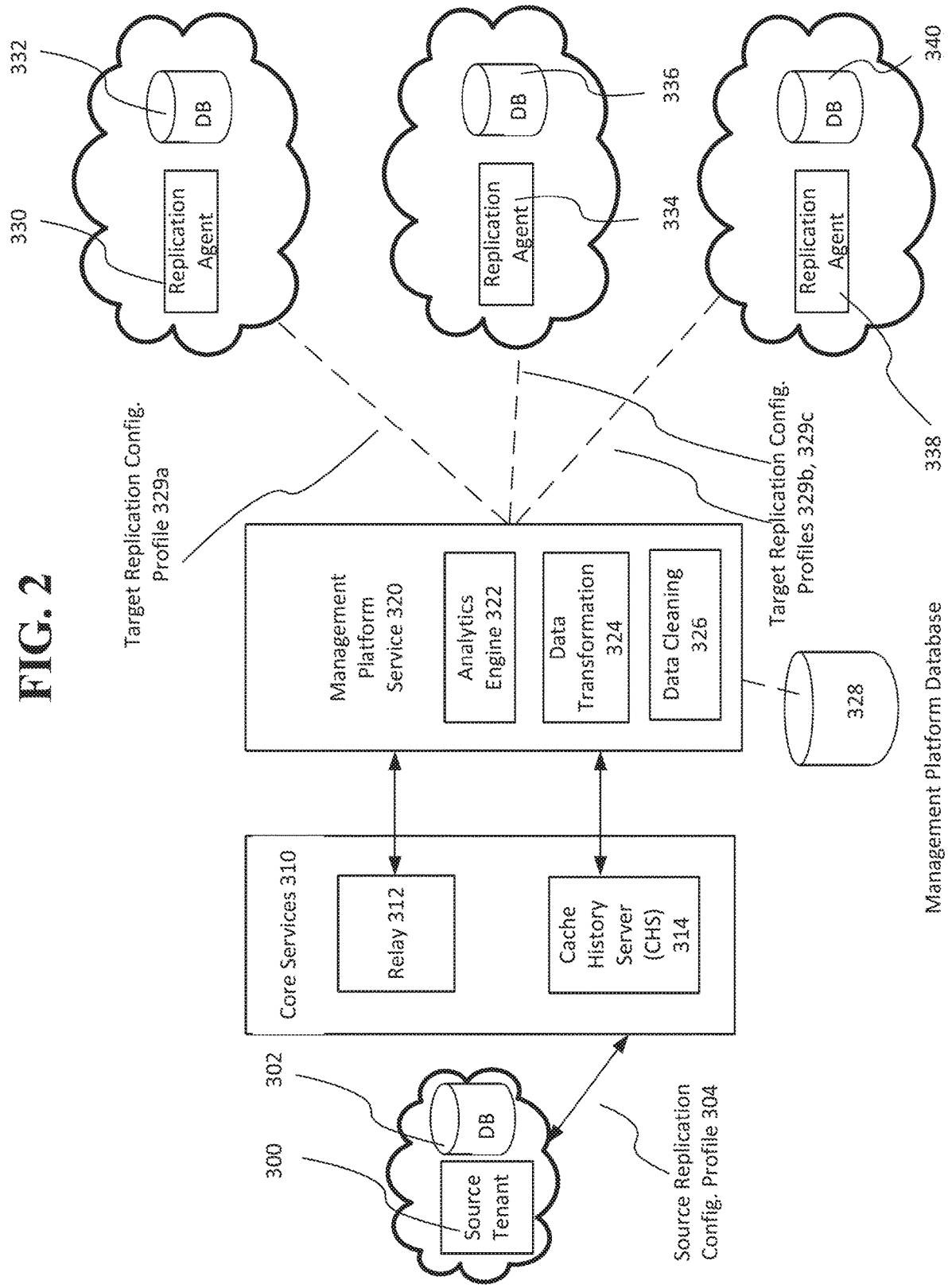

SYSTEMS AND METHODS OF DETERMINING TARGET DATABASE FOR REPLICATION OF TENANT DATA

BACKGROUND

Presently, database administrators must manually configure source datastores and/or source databases, and manually identify the target databases for replication of tenant data of the source datastore and/or databases. Database administrators must manually ensure data availability and consistency of data in a replication or migration of tenant data from the source datastore and/or database to the target database.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

FIG. 1A shows an example method of determining potential target databases that selected tenant data may be replicated and/or migrated to according to an implementation of the disclosed subject matter.

FIG. 2 shows a network configuration including a management platform service for managing the replication and/or migration of selected tenant data to a target database according to an implementation of the disclosed subject matter.

DETAILED DESCRIPTION

Figure 1B:
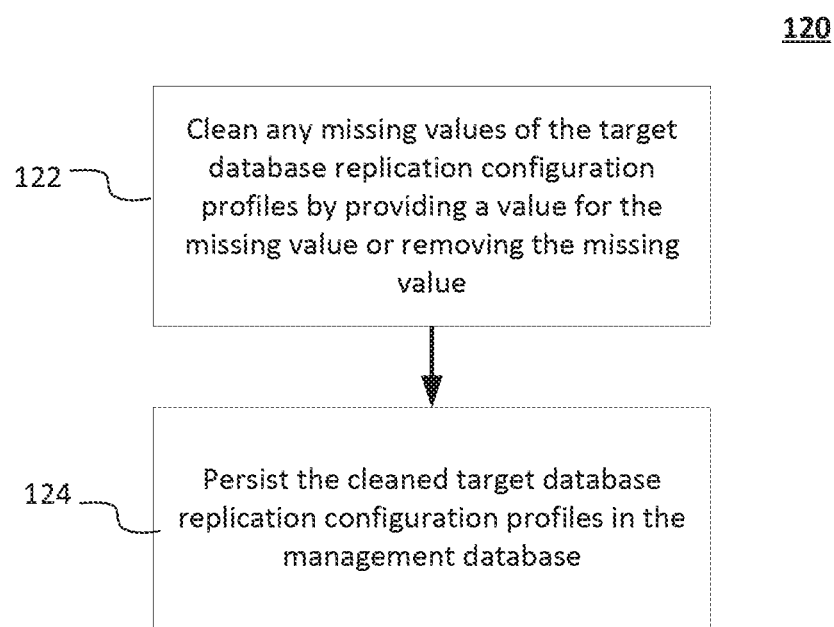
FIG. 1B shows an example method of cleaning and persisting target database replication configuration profiles in a management platform database for the example method shown in FIG. 1A according to an implementation of the disclosed subject matter.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Implementations of the disclosed subject matter provide replication configuration profile data structures for source tenant data and target databases, as well as a management platform service, which may be used to manage the replication and/or migration of tenant data from a source database to a target database. The server of a management platform service may retrieve the source database replication configuration profile from the source database (based on the tenant data selected for replication or migration). A target database replication configuration profile may be specified for each of the potential target databases that the selected tenant data may be replicated and/or migrated to. For example, the target database replication configuration profile may define storage requirements, use of logs, performance, data size, and the like. The server of a management platform service may read the target database replication configuration profiles of prospective target databases to determine which of the target databases may be suitable for the data replication and/or migration operation. That is, implementations of the disclosed subject matter avoid configuring workloads with incompatible target databases resources, which improves Quality of Service (QoS) of workload deployment.

Presently, database administrators must manually configure source datastores, and manually identify the target databases. Database administrators must manually ensure data availability and consistency of data in a replication or migration of tenant data. These operations require that the database administrator have knowledge of different technologies and domains, which may have continuous change, such as when new versions of resources and software are released. Any misconfigurations can lead to the downtime of an application, which impacts the service level agreement (SLA). Errors made by an administrator may lead to incorrect target databases configurations, and may lead to latency and throughput issues for replication or migration of tenant data from a source database.

In a traditional cloud database environment or traditional datacenter environment that includes databases, an administrator needs to ensure availability and consistency of data, and manually handle replication or migration of tenant data. Data transactions or replications that are not handled in a consistent manner typically leads to erroneous data in databases, thus placing data consistency at risk.

As the amount of data stored in databases increases, maintaining the tenant data availability and consistency for cloud server based applications and/or databases becomes a difficult task for an administrator. In a SaaS (Software as a Service) based application or a database, it is important to ensure high availability of tenant based data, and to meet the SLA (Service Level Agreement) of customers.

Database replication, where at least a portion of tenant data is replicated from a source database to a target database, may be used for storing data across databases instances in a cloud server system. This may provide availability of data across locations and provide the SLA of the customer requirements, in terms of data availability.

Presently, a cloud database administrator configures the tenant data of the source database to be replicated, and identifies target databases manually without consideration of the Quality of Service for the data availability and data consistency. For example, a major downtime of a cloud server application where SEV=0 (i.e., the severity incident is a catastrophic Service impact) may cause disruption to many customers due to a lack of live data replication, point-in-time snapshots, and backup data. This resulted in customer data lacking security, availability, and consistency. In this example, the SLA of the customers may not be met.

Having an administrator manually ensure data availability and consistency, as well as provide data replication and/or migration, typically leads to errors. These operations require the administrator to have knowledge of different technologies and domains, which may continually change whenever new versions of resources and software are released by vendors.

Administrators need to keep themselves up to-date with the rapid changes in technology and domains. Due to above factors for ensuring data availability and consistency of data in a data center that includes databases, manually administering data operations such as replication and/or migration require substantial effort and are typically inefficient. For example, when new version of an application or database software is to be deployed, administrators need to identify the right set of the nodes in the datacenter for configuring the database and/or application, as well as consider the hardware resources, network connections, and the like. Any misconfigurations can lead to the downtime of the application and/or database, and thus impact the SLA. That is, incorrect target databases configurations can lead to latency and throughput of overall replication and/or migration of tenant data from the source database to a target database.

Implementations of the disclosed subject matter avoid workload outages and performance issues of database workloads that are typically attributed to a lack of resources and database software QoS (Quality of Service) configurations in cloud server environment. With no manual processes to find the suitable target databases for replication in cloud environment, implementations of the disclosed subject matter may improve overall usage of all the resources in the cloud database environment, and may provide desired performance with a suitable target database configured replication. Implementations of the disclosed subject matter avoid configuring workloads with incompatible target database resources and/or software which improves Quality of Service of workload deployment. This may reduce turnaround time and/or latency for overall performance of applications. The disclosed subject matter determines suitable target database resources for replication and/or migration of at least a selected portion of tenant data using configuration profile data structures for source tenant data and target databases.

Implementations of the disclosed subject matter may be used for homogeneous or heterogeneous databases resources that may be from one or more vendors.

The disclosed subject matter avoids security threats due to misconfigured target database replication resources and software in cloud database environment.

When incompatible target databases resources are enabled for replication and software configured for any workload, it may cause excessive power consumption. The disclosed subject matter avoids incompatible databases for replication, and hence avoids excessive power consumption.

FIGS. 1A-1D show example methods of determining potential target databases that selected tenant data may be replicated and/or migrated to according to implementations of the disclosed subject matter. As shown in FIG. 1A, method 100 includes operation 110 to retrieve, at a server (e.g., central component 600 and/or second computer 700 shown in FIG. 3) of a management platform service (e.g., management platform service 320 shown in FIG. 2), a source database replication configuration profile that is used to determine one or more databases of a plurality of target databases (e.g., target databases 332, 336, and/or 340 shown in FIG. 2, and/or databases system databases 1200a-1200d shown in FIG. 4) to store selected tenant data (e.g., of source tenant 300 shown in FIG. 2) of a source database (e.g., source database 302 shown in FIG. 2) to be replicated.

The source database replication configuration profile may include at least one of a database name, database vendor, server cloud provider, server cloud vendor, number of idle connections, number of currently available connections, number of connections released, storage allocation amount, storage type, archived logs, transactional logs, page size, read IOPs (input/output operations per second), write IOPs, databus and/or transport layer performance, projected time for completion of replication, data size of the tenant data to be replicated, total row count of the tenant data to be replicated, total table count of the tenant data to be replicated, and the like. In some implementations, the source database replication configuration profile may be defined using a markup language such as JSON (JavaScript™ Object Notation), YML and/or YAML ("YAML Ain't Markup Language"), or any other suitable language and/or format. Below is an example of a source database replication configuration profile:

```
{
"dbName": "NA-1-DB"
"dbVendor": "Vendor1"
"dbCloudProvider": "Provider1",
"cloudVendor": "cloudVendor1"
"description": {
    "message":"Vendor1 Enterprise Database"
},
"connections": {
"Idle": 10,
"currAvail":50,
"connRelease":10
}
"storage": {
"currentAllocation": "1024TB",
"currentStorageType":"SSD"
},
"logs" :{
"archieved": "Yes",
"transactional-logs":"Yes"
},
"performance" :{
"hugePages": "1024GB",
"readIOPs":1gbps,
"writeIOPs":2gbps,
{,
"databus": {
"projectedTimeForCompletion":"12hrs",
},
"data" : {
    "currDatasize":"1TB",
    "currtotalRowCount":"65000",
    "currTotalTableCount":"1024"
}
}
```

Operation 120 may include retrieving, at the server of the management platform service from each the plurality of target databases, a target database replication configuration profile (e.g., target replication configuration profiles 329a-329c shown in FIG. 2). The server of the management platform service may transform the retrieved target database replication configuration profiles to persist in a management platform database (e.g., management platform database 328 shown in FIG. 2) at operation 130.

The target database replication configuration profile may include at least one of a number of total available connections, number of idle connections, connection timeout time, projected storage allocation amount, projected storage type, archived logs, transactional logs, projected page size, projected tenant IOPs (input/output operations per second), projected tenant datasize, projected tenant row count, projected tenant table count, and the like. In some implementations, the target database replication configuration profile may be defined using a markup language such as JSON, YML and/or YAML, or any other suitable language and/or format. Below is an example of a target database replication configuration profile:

```
{
    "connections": {
        "totalAvail":150,
        "connIdle":10,
        "connTimeout": 1ms
    }
    "storage": {
        "projectedAllocation": "2048TB",
        "projectedStorageType":"SSD"
    },
    "logs" :{
        "archived": "Yes",
        "transactional-logs":"Yes"
    },
    "performance" :{
        "projectedOrgHugePages": "2024GB",
        "projectedOrgIOPs": 12gbps,
    },
    "data" : {
        "projectedOrgDatasize":"3TB",
        "projectedOrgRowCount":"100000",
        "projectedOrgTableCount":"10024"
    }
}
```

At operation 140, the server of the management platform service (e.g., management platform service 320 shown in FIG. 2) may compare the retrieved source database replication configuration profile (e.g., source database replication configuration profile 304) and the target database replication configuration profiles (e.g., target replication configuration profiles 329a-329c) to determine which target databases (e.g., target databases 332, 336, and/or 340 shown in FIG. 2, and/or databases system databases 1200a-1200d shown in FIG. 4) are usable to replicate the selected tenant data to. The server of the management platform service may classify the target database replication configuration profiles based on results of the comparison of the source database replication configuration profile and the target database replication configuration profiles at operation 150.

The server of the management platform service may generate a list of one or more target databases of the plurality of target databases for the selected tenant data of the source database to be replicated to based on the classification of the target database replication configuration profiles at operation 160. In some implementations, the server of the management platform service may retrieve a latency of a transport layer (e.g., databus or the like) and a transmission rate performance of the plurality of target databases, and may generate the list of one or more target databases of the plurality of target databases based on the retrieved latency of the transport layer, the transmission rate performance of the plurality of target databases, and the classification of the target database replication configuration profiles.

Figure 4:
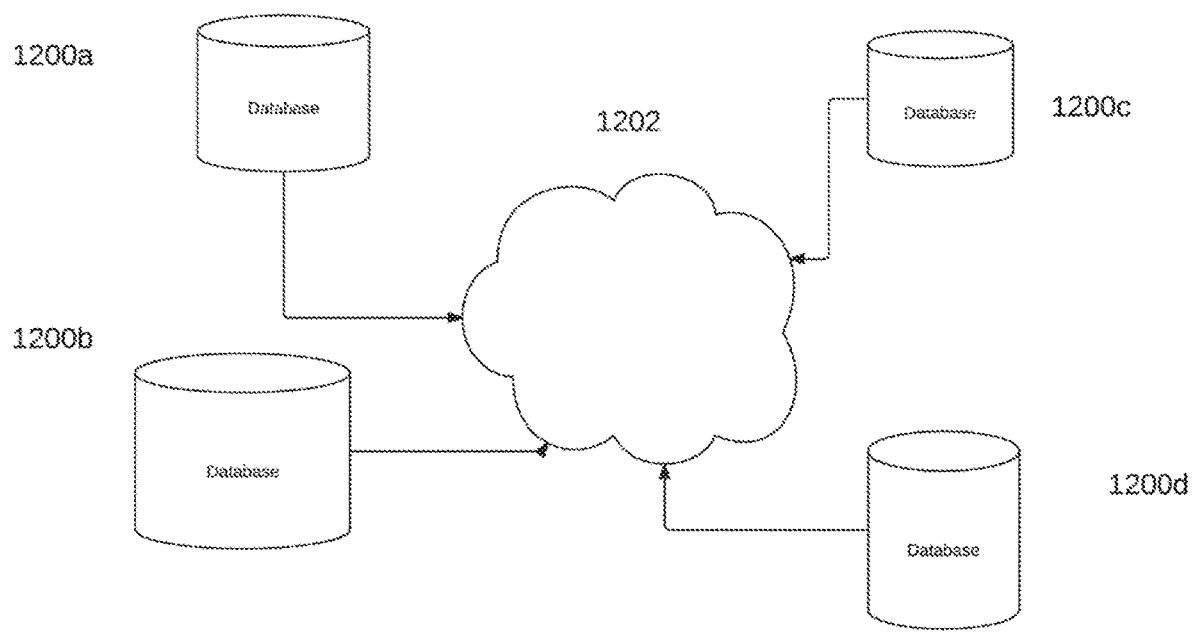
FIG. 4 shows a network configuration according to an implementation of the disclosed subject matter.

In some implementations, the retrieving the target database replication configuration profile at operation 120 may include deploying, at the server of the management platform service, a replication agent (e.g., replication agent 330, 334, 338 shown in FIG. 2) to retrieve the target database replication configuration profile (e.g., target replication configuration profiles 329a-329c) for each of the plurality of target databases (e.g., target databases 332, 336, and/or 340 shown in FIG. 2, and/or databases system databases 1200a-1200d shown in FIG. 4). The replication agent may be deployed by the server of the management platform service to a "Kingdom" level of a database network structure, and may provide the server of the management platform service with the target database replication configuration profiles of the target databases.

FIG. 1B shows an implementation of retrieving of the target database replication configuration profiles (e.g., target replication configuration profiles 329a-329c shown in FIG. 2) from each the plurality of target databases (e.g., target databases 332, 336, and/or 340 shown in FIG. 3, and/or databases system databases 1200a-1200d shown in FIG. 4) at operation 120 shown in FIG. 1. At operation 122 shown in FIG. 1B, any missing values of the target database replication configuration profiles may be cleaned by providing a value for the missing value or removing the missing value. At operation 124, the cleaned target database replication configuration profiles may be persisted in the management platform database (e.g., management platform database 328 shown in FIG. 2).

In some implementations, the transforming the retrieved target database replication configuration profiles to persist in the management platform database at operation 130 in FIG. 1A may include transforming the selected tenant data so that there are no underlying database specific parameters before replicating the selected tenant data.

The example method 100 shown in FIG. 1A may include transmitting, at the server of the management platform service, the generated list of one or more target databases of the plurality of target databases (e.g., target databases 332, 336, and/or 340 shown in FIG. 2, and/or databases system databases 1200a-1200d shown in FIG. 5) for the selected tenant data to be replicated to. In some implementations, the generated list may be transmitted to the computer 500 shown in FIG. 3.

Figure 1C:
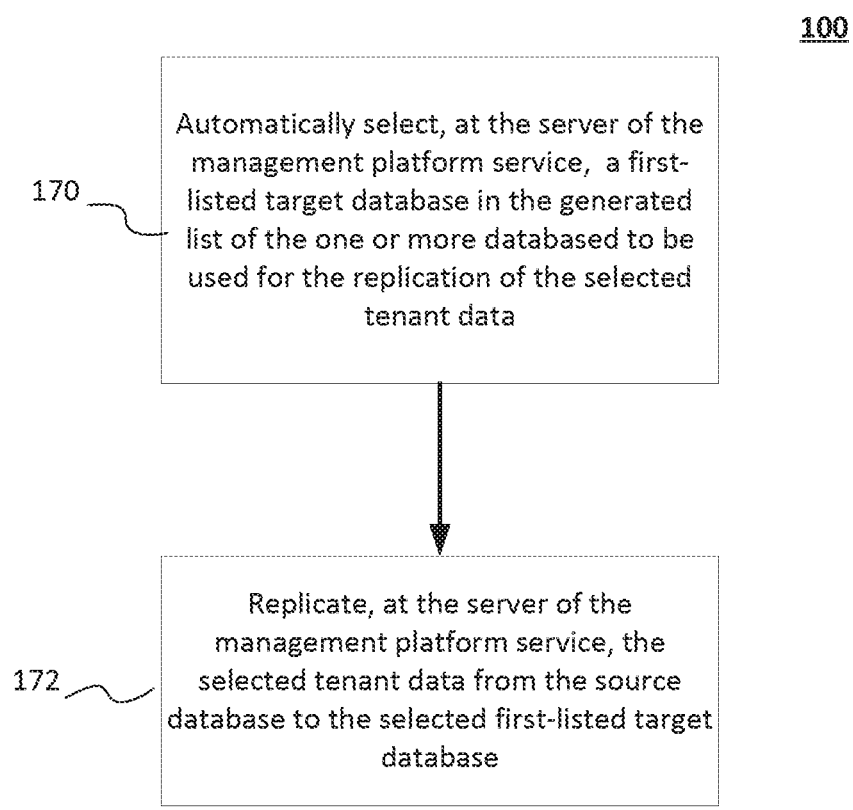
FIG. 1C shows an example method of automatically selecting a target database and replicating and/or migrating the selected tenant data to the automatically selected target database for the example method shown in FIG. 1A according to an implementation of the disclosed subject matter.
Figure 1D:
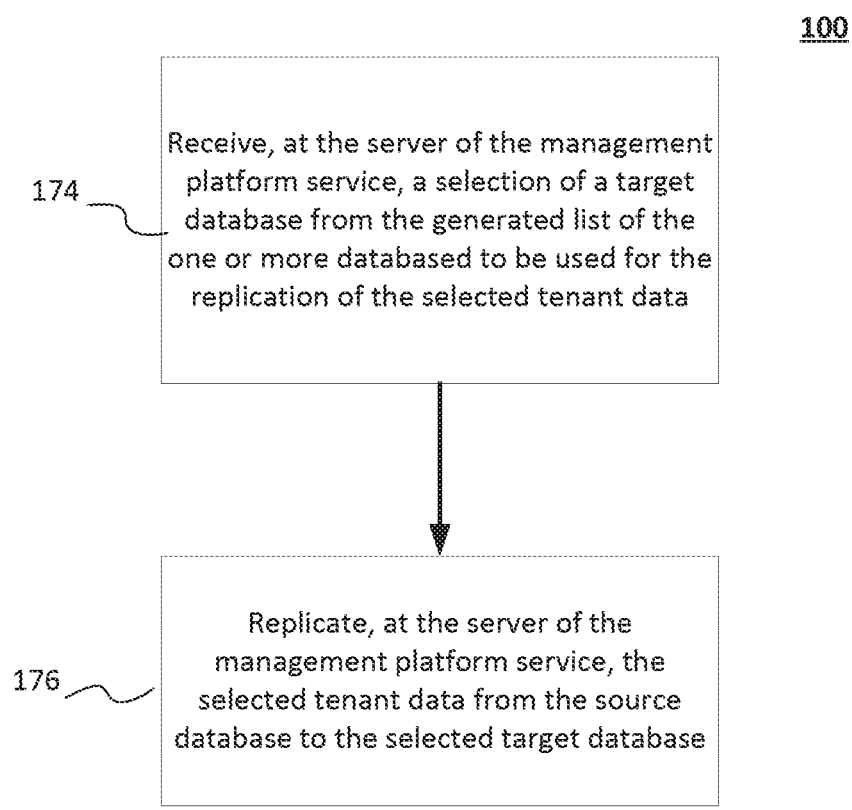
FIG. 1D shows an example method of receiving a selection of a target database from a generated list of target databases, and replicating and/or migrating the selected tenant data to the selected target database for the example method shown in FIG. 1A according to an implementation of the disclosed subject matter.

The example method 100 shown in FIG. 1A may include automatically selecting, at the server of the management platform service, a first-listed target database in the generated list of the one or more databases to be used for the replication of the selected tenant data at operation 170 shown in FIG. 1C. At operation 172, the server of the management platform service may replicate the selected tenant data from the source database (e.g., source database 302 shown in FIG. 2) to the selected first-listed target database. Alternatively, as shown in FIG. 1D, the server of the management platform service may receive a selection of a target database from the generated list of the one or more databases to be used for the replication of the selected tenant data at operation 174. For example, the server of the management platform service may receive the selection from computer 500 shown in FIG. 3. At operation 176, the server of the management platform service may replicate the selected tenant data from the source database to the selected target database.

FIG. 2 shows a network configuration including a management platform service for managing the replication and/or migration of selected tenant data to a target database according to an implementation of the disclosed subject matter. A source tenant 300 may have source tenant data stored in source database 302. The source tenant 300 and/or the source database 302 may be a server, cloud server, database, cluster, application server, neural network system, or the like.

Core services 310 may be provided by a server, cloud server, database, cluster, application server, neural network system, or the like that is communicatively coupled to the source tenant 300 and/or the source database 302, and/or the management platform service 320. The core services 310 may include relay 312 and/or the cache history server (CHS) 314. Relay 312 may retrieve the source database replication configuration profile from the source tenant 300 and/or the source database 302, and provide it to the management platform service 320. The CHS 314 may provide any missing data from the retrieved source database replication configuration profile to the management platform service 320. That is, the CHS 314 may store and/or access cached data of the source database replication configuration profile and/or other data of the source tenant 300 and/or the source database 302. The management platform service 320 may retrieve the source database replication configuration profile and/or any related profile data that may be missing and/or corrupted from the core services 310. The core services 310, relay 312, and/or CHS 314 may be software, hardware, and/or a combination thereof to provide source database replication configuration profiles and related data to the management platform service 320 to manage replication of selected tenant data from the source database 302 to one or more of the target databases 332, 336, 340.

The management platform service 320 may be a server, cloud server, database, cluster, application server, neural network system, or the like that is communicatively coupled to the core services 310, target databases 332, 336, 340, and/or the management platform database 328. The management platform service 320 may include analytics engine 322, data transformation 324, and/or data cleaning 326. The management platform database 328 may be software, hardware, and/or a combination thereof to provide a database to the management platform service 320.

The analytics engine 322 may be software, hardware, and/or a combination thereof to identify the source database replication configuration profile with respect to the tenant data to be replicated from the source database 302, and reads the target database replication configuration profiles (e.g., target replication configuration profiles 329a-329c shown in FIG. 2). The data transformation 324 may be software, hardware, and/or a combination thereof to provide transformation of data (e.g., source and target replication configuration profile data) to ensure there is no underlying database specific parameters while comparing and validating the data of the target database replication configuration profiles (e.g., target replication configuration profiles 329a-329c shown in FIG. 2) and the source database replication configuration profile. The data cleaning 326 may be software, hardware, and/or a combination thereof to receive the target database replication configuration profiles (e.g., target replication configuration profiles 329a-329c shown in FIG. 2) from the target databases 332, 336, 340 and cleans any missing values so as to determine values for the missing values or removes the field for the missing values, and persists the cleaned target database replication configuration profiles in the management platform database 328.

The management platform service 320 may validate and compare the target database replication configuration profiles (e.g., target replication configuration profiles 329a-329c shown in FIG. 2) from the target databases 332, 336, 340 and the source database replication configuration profile retrieved from the source database 302 via the core services 310 to generate the list of one or more target databases of the plurality of target databases (e.g., target databases 332, 336, 340 shown in FIG. 2) for the selected tenant data of the source database to be replicated to. In some implementations, the management platform service 320 may automatically select the first item in generated list of the one or more target databases. The management platform service 320 may replicate the selected tenant data from the source database (e.g., source database 302 shown in FIG. 2) to the selected target database (e.g., one of target databases 332, 336, 340 shown in FIG. 2). In some implementations, the management platform service may receive a selection (e.g., via computer 500 shown in FIG. 3) of a target database from the generated list. The management platform service 320 may replicate the selected tenant data from the source database 302 to the selected target database.

The target databases 332, 336, 340 may be a server, cloud server, database, cluster, application server, neural network system, or the like that are communicatively coupled to the management platform service 320, and may have replication agents 330, 334, and 338, respectively. The replication agents 330, 334, and 338 may respectively provide target replication configuration profiles 329a, 329b, and 329c to the management platform service 320. Using the target replication configuration profiles 329a, 329b, and 329c and the source database replication configuration profile from the source database 302, the management platform service 320 may replicate the selected tenant data of the source database 302 to the selected target database.

The below example shows a table (i.e., Table 1) of target databases (TargetDB) across cloud servers (e.g., target databases 332, 336, 340 shown in FIG. 2), where each target database may have a universally unique identified (UUID). The table may be generated by the management platform service 320, based on the target replication configuration profiles 329a, 329b, and 329c and the source database replication configuration profile from the source database 302. In Table 1, product name (e.g., Product1, Product2, and the like) may represent a type of database (e.g., Oracle™, Salesforce™, MySQL™, Maria, PostGres, or the like), and product vendor (e.g., Vendor1, Vendor2, and the like) may be the company that provides and/or distributes the database (e.g., Oracle™, Salesforce™, open source, or the like). The target replication configuration profiles may be generated using JSON, YML and/or YAML, or any other suitable language and/or format. The "cloud" may be entity managing the cloud servers (e.g., Salesforce™, AWS™ (Amazon™ Web Services), GCE™ (Google™ Compute Engine), and the like), and/or the location (e.g., geographic location, data warehouse (DWH) location, or the like) of the cloud servers.

TABLE 1

| Target DB UUID | Product Name | Product Vendor | Product Type | Product Version | Cloud | Config |
|---|---|---|---|---|---|---|
| UUID1 | Product1 | Company 1 | Enterprise | 11.2 | Cloud1-Phoenix | JSON |
| UUID2 | Product2 | Company 2 | Enterprise | 5.2 | Cloud2-DWH | JSON |
| UUID3 | Product3 | Company 3 | Enterprise | 8.0 | Cloud3 | JSON |
| UUID4 | Product4 | Open Source | Enterprise | 9.0 | Cloud4-Hyderabad | JSON |
| UUID5 | Product5 | Open Source | Enterprise | 5.0 | Cloud5 | JSON |

From Table 1 above, the management platform service 320 has identified five potential target databases that may be available to replicate the selected tenant data to. Table 2 below is an example of the management platform service 320 using the source database replication configuration profile from the source database 302 to identify the target replication configuration profiles 329a, 329b, and 329c and the across cloud server database systems (e.g., target databases 332, 336, 340).

TABLE 2

| Replication Profile UUID | Profile Configuration | Tenant ID |
| --- | --- | --- |
| RP-1 | JSON | vxyz-abcd-efgh-ijkl |
| RP-2 | JSON | 1234-5678-9010-1111 |
| RP-3 | JSON | 1111-5678-9010-1111 |
| RP-4 | JSON | 2222-5678-9010-1111 |

From Table 2 above, the RP-1 profile may be configured by the management platform service 320 to replicate the tenant data of tenant vxyz-abcd-efgh-ijkl of the source database 302 having the tenant identifier vxyz-abcd-efgh-ijkl. As discussed above, the management platform service 320 may generate a list of the target databases having target replication configuration profiles (e.g., target replication configuration profiles 329a, 329b, and 329c) that match or match a predetermined amount of the source database replication configuration profile from the source database 302. For example, the generated list of target databases may include target databases having target replication configuration profiles that match the source database replication configuration profile 100%, 90%, 80%, or the like. When the match is less than 100%, the management platform service 320 may utilize a second target database to make up for the discrepancy, and/or may transform at least a portion of the selected tenant data of the source tenant database when replicating it to the target database.

In some implementations, the analytics engine 322 of the management platform service 320 may verify and validate the target database and the target replication configuration profile using the source database replication configuration profile. Based on the results of this validation, the analytics engine 322 may generate the list of target databases that may be used for the replication of the selected tenant data. For example, the generated list of target databases may include those target databases having the identifiers UUID2 and UUID5 from Table 1 above.

Figure 3:
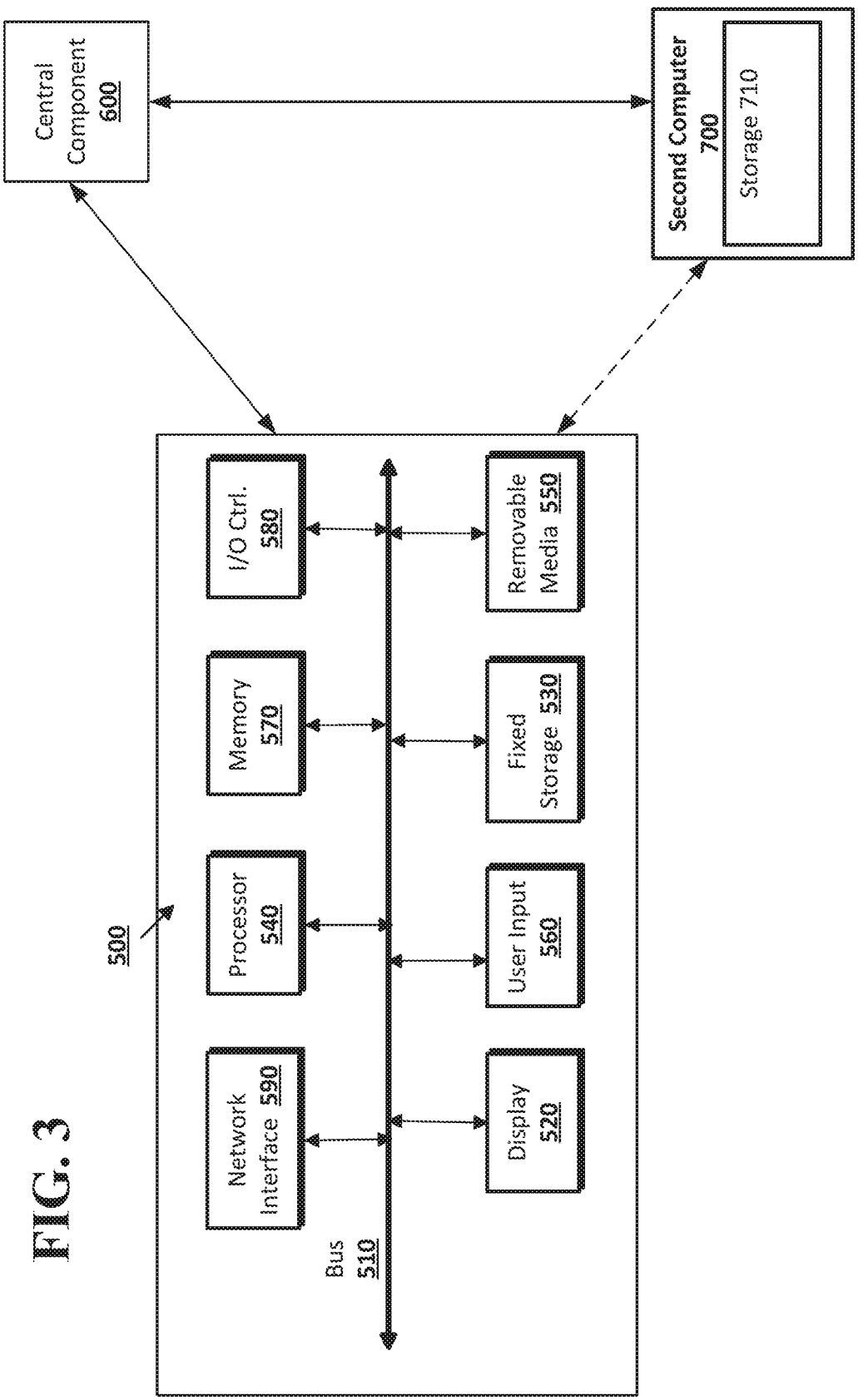
FIG. 3 shows a computer system according to an implementation of the disclosed subject matter.

Implementations of the presently disclosed subject matter may be implemented in and used with a variety of component and network architectures. FIG. 3 is an example computer 500 suitable for implementing implementations of the presently disclosed subject matter. As discussed in further detail herein, the computer 500 may be a single computer in a network of multiple computers. In some implementations, the computer 500 may be used to select tenant data to be replicated. The computer 500 may include the source tenant 300 and/or the source database 302. As shown in FIG. 3, the computer 500 may communicate with a central or distributed component 600 (e.g., server, cloud server, database, cluster, application server, neural network system, or the like). In some implementations, the central component 600 may be management platform service 320 and/or core services 310 shown in FIG. 2. The central component 600 may communicate with one or more other computers such as the second computer 700, which may include a storage device 710. The second computer 700 may be a server, cloud server, neural network system, or the like. The storage 710 may use any suitable combination of any suitable volatile and non-volatile physical storage mediums, including, for example, hard disk drives, solid state drives, optical media, flash memory, tape drives, registers, and random access memory, or the like, or any combination thereof. In some implementations, the storage 710 may store the selected tenant data to be replicated to a target database (e.g., another portion of storage 710, and/or one or more of database systems 1200a-1200d). In some implementations, the second computer 700 and/or the storage 710 may be the target database (e.g., target database 332, 336, 340).

The storage 410 of the second computer 400 can store the tenant data to be replicated using a log structured merge (LSM) tree with multiple levels. Further, if the systems shown in FIGS. 3-4 are multitenant systems, the storage can be organized into separate log structured merge trees for each instance of a database for a tenant. Alternatively, contents of all records on a particular server or system can be stored within a single log structured merge tree, in which case unique tenant identifiers associated with versions of records can be used to distinguish between data for each tenant as disclosed herein. More recent transactions can be stored at the highest or top level of the tree and older transactions can be stored at lower levels of the tree. Alternatively, the most recent transaction or version for each record (i.e., contents of each record) can be stored at the highest level of the tree and prior versions or prior transactions at lower levels of the tree.

The information obtained to and/or from a central component 600 can be isolated for each computer such that computer 500 cannot share information with computer 400 (e.g., for security and/or testing purposes). Alternatively, or in addition, computer 500 can communicate directly with the second computer 700.

The computer (e.g., user computer, enterprise computer, or the like) 500 may include a bus 510 which interconnects major components of the computer 500, such as a central processor 540, a memory 570 (typically RAM, but which can also include ROM, flash RAM, or the like), an input/output controller 580, a user display 520, such as a display or touch screen via a display adapter, a user input interface 560, which may include one or more controllers and associated user input or devices such as a keyboard, mouse, Wi-Fi/cellular radios, touchscreen, microphone/speakers and the like, and may be communicatively coupled to the I/O controller 580, fixed storage 530, such as a hard drive, flash storage, Fibre Channel network, SAN device, SCSI device, and the like, and a removable media component 550 operative to control and receive an optical disk, flash drive, and the like.

The bus 510 may enable data communication between the central processor 540 and the memory 570, which may include read-only memory (ROM) or flash memory (neither shown), and random access memory (RAM) (not shown), as previously noted. The RAM may include the main memory into which the operating system, development software, testing programs, and application programs are loaded. The ROM or flash memory can contain, among other code, the Basic Input-Output system (BIOS) which controls basic hardware operation such as the interaction with peripheral components. Applications resident with the computer 500 may be stored on and accessed via a computer readable medium, such as a hard disk drive (e.g., fixed storage 530), an optical drive, floppy disk, or other storage medium 550.

The fixed storage 530 can be integral with the computer 500 or can be separate and accessed through other interfaces.

The fixed storage 530 may be part of a storage area network (SAN). A network interface 590 can provide a direct connection to a remote server via a telephone link, to the Internet via an internet service provider (ISP), or a direct connection to a remote server via a direct network link to the Internet via a POP (point of presence) or other technique. The network interface 590 can provide such connection using wireless techniques, including digital cellular telephone connection, Cellular Digital Packet Data (CDPD) connection, digital satellite data connection or the like. For example, the network interface 590 may enable the computer to communicate with other computers and/or storage devices via one or more local, wide-area, or other networks, as shown in FIGS. 3-4.

Many other devices or components (not shown) may be connected in a similar manner (e.g., data cache systems, application servers, communication network switches, firewall devices, authentication and/or authorization servers, computer and/or network security systems, and the like). Conversely, all the components shown in FIGS. 3-4 need not be present to practice the present disclosure. The components can be interconnected in different ways from that shown. Code to implement the present disclosure can be stored in computer-readable storage media such as one or more of the memory 570, fixed storage 530, removable media 550, or on a remote storage location.

FIG. 4 shows an example network arrangement according to an implementation of the disclosed subject matter. Four separate database systems 1200a-d at different nodes in the network represented by cloud 1202 communicate with each other through networking links 1204 and with users (not shown). The database systems 1200a-d may be, for example, different may be potential target databases (e.g., target databases 332, 336, 340 shown in FIG. 2) that the selected tenant data from a source database may be replicated to. In some implementations, the one or more of the database systems 1200a-d may be located in different geographic locations. Each of database systems 1200 can be operable to host multiple instances of a database, where each instance is accessible only to users associated with a particular tenant. Each of the database systems can constitute a cluster of computers along with a storage area network (not shown), load balancers and backup servers along with firewalls, other security systems, and authentication systems. Some of the instances at any of database systems 1200a-d may be live or production instances processing and committing transactions received from users and/or developers, and/or from computing elements (not shown) for receiving and providing data for storage in the instances.

One or more of the database systems 1200a-d may include at least one storage device, such as in FIG. 3. For example, the storage can include memory 570, fixed storage 530, removable media 550, and/or a storage device included with the central component 600 and/or the second computer 700. The tenant can have tenant data stored in an immutable storage of the at least one storage device associated with a tenant identifier.

In some implementations, the one or more servers shown in FIGS. 3-4 can store the data (e.g., replicated and/or migrated tenant data, target replication configuration profiles, and the like) in the immutable storage of the at least one storage device (e.g., a storage device associated with central component 600, the second computer 700, and/or the database systems 1200a-1200d) using a log-structured merge tree data structure.

The systems and methods of the disclosed subject matter can be for single tenancy and/or multitenancy systems.

Multitenancy systems can allow various tenants, which can be, for example, developers, users, groups of users, and/or organizations, to access their own records (e.g., tenant data, replication configuration profiles, and the like) on the server system through software tools or instances on the server system that can be shared among the various tenants. The contents of records for each tenant can be part of a database containing that tenant. Contents of records for multiple tenants can all be stored together within the same database, but each tenant can only be able to access contents of records which belong to, or were created by, that tenant. This may allow a database system to enable multitenancy without having to store each tenants' contents of records separately, for example, on separate servers or server systems. The database for a tenant can be, for example, a relational database, hierarchical database, or any other suitable database type. All records stored on the server system can be stored in any suitable structure, including, for example, a log structured merge (LSM) tree.

Further, a multitenant system can have various tenant instances on server systems distributed throughout a network with a computing system at each node. The live or production database instance of each tenant may have its transactions processed at one computer system. The computing system for processing the transactions of that instance may also process transactions of other instances for other tenants.

Some portions of the detailed description are presented in terms of diagrams or algorithms and symbolic representations of operations on data bits within a computer memory. These diagrams and algorithmic descriptions and representations are commonly used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all these and similar terms are to be associated with the appropriate physical quantities and are merely convenient labels applied to these quantities. Unless specifically stated otherwise as apparent from the above discussion, it is appreciated that throughout the description, discussions utilizing terms such as "retrieving," "transforming," "comparing," "classifying," "generating," "deploying," "cleaning," "persisting," "transmitting," "selecting," "replicating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

More generally, various implementations of the presently disclosed subject matter can include or be implemented in the form of computer-implemented processes and apparatuses for practicing those processes. Implementations also can be implemented in the form of a computer program product having computer program code containing instructions implemented in non-transitory and/or tangible media, such as hard drives, solid state drives, USB (universal serial bus) drives, CD-ROMs, or any other machine readable storage medium, wherein, when the computer program code is loaded into and executed by a computer, the computer becomes an apparatus for practicing implementations of the disclosed subject matter. Implementations also can be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions. Implementations can be implemented using hardware that can include a processor, such as a general purpose microprocessor and/or an Application Specific Integrated Circuit (ASIC) that implements all or part of the techniques according to implementations of the disclosed subject matter in hardware and/or firmware. The processor can be coupled to memory, such as RAM, ROM, flash memory, a hard disk or any other device capable of storing electronic information. The memory can store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described to explain the principles of implementations of the disclosed subject matter and their practical applications, to thereby enable others skilled in the art to utilize those implementations as well as various implementations with various modifications as can be suited to the particular use contemplated.

The invention claimed is:

1. A method comprising:
retrieving, at a server of a management platform service, a source database replication configuration profile that is used to determine one or more databases of a plurality of target databases to store selected tenant data of a source database to be replicated, wherein the source database replication configuration profile includes a number of idle connections, a number of currently available connections, and a number of connections released;
retrieving, at the server of the management platform service from each of the plurality of target databases, a target database replication configuration profile that includes a number of total available connections, a number of idle connections, and a connection timeout time;
determining, at the server of the management platform service, any corrupted values of the retrieved target database replication configuration profiles;
providing, at the server of the management platform service, a value for any of the determined corrupted values;
transforming, at the server of the management platform service, the retrieved target database replication configuration profiles to persist in a management platform database that is communicatively coupled to the server of the platform management service;
transforming, at the server of the management platform service, the selected tenant data to remove database specific parameters that are different from tenant data and are for a type or version of a database before replicating the selected tenant data;
comparing, at the server of the management platform service, the retrieved source database replication configuration profile and the target database replication configuration profiles to determine which target databases are usable to replicate the transformed selected tenant data to;
classifying, at the server of the management platform service, the target database replication configuration profiles based on results of the comparison of the source database replication configuration profile and the target database replication configuration profiles; and
generating, at the server of the management platform service, a list of one or more target databases of the plurality of target databases for the transformed selected tenant data of the source database to be replicated to based on the classification of the target database replication configuration profiles.

2. The method of claim 1, further comprising:
retrieving, at the server of the management platform service, a latency of a transport layer and a transmission rate performance of the plurality of target databases,
wherein the generating the list of one or more target databases of the plurality of target databases is based on the retrieved latency of the transport layer and the transmission rate performance of the plurality of target databases.

3. The method of claim 1, wherein the retrieving the target database replication configuration profile comprises:
deploying, at the server of the management platform service, a replication agent to retrieve the target database replication configuration profile for each of the plurality of target databases.

4. The method of claim 1, wherein the retrieving of the target database replication configuration profiles from each the plurality of target databases, further comprises:
cleaning any missing values of the target database replication configuration profiles by providing a value for the missing value or removing the missing value; and
persisting the cleaned target database replication configuration profiles in the management platform database.

5. The method of claim 1, further comprising:
transmitting, at the server of the management platform service, the generated list of one or more target databases of the plurality of target databases for the transformed selected tenant data to be replicated to.

6. The method of claim 1, further comprising:
automatically selecting, at the server of the management platform service, a first-listed target database in the generated list of the one or more databases to be used for the replication of the transformed selected tenant data; and replicating, at the server of the management platform service, the transformed selected tenant data from the source database to the selected first-listed target database.

7. The method of claim 1, further comprising:
receiving, at the server of the management platform service, a selection of a target database from the generated list of the one or more databases to be used for the replication of the transformed selected tenant data; and
replicating, at the server of the management platform service, the transformed selected tenant data from the source database to the selected target database.

8. The method of claim 1, wherein the source database replication configuration profile includes at least one from the group consisting of: database name, database vendor, server cloud provider, server cloud vendor, storage allocation amount, storage type, archived logs, transactional logs, page size, read IOPs (input/output operations per second), write IOPs, projected time for completion of replication, data size of the tenant data to be replicated, total row count of the tenant data to be replicated, and total table count of the tenant data to be replicated.

9. The method of claim 1, wherein the target database replication configuration includes at least one from the group consisting of: projected storage allocation amount, projected storage type, archived logs, transactional logs, projected page size, projected tenant IOPs (input/output operations per second), projected tenant data size, projected tenant row count, and projected tenant table count.

10. A system comprising:
a source database;
a plurality of target databases; and
a server of a management platform service communicatively coupled to the source target database and the plurality of target databases to retrieve a source database replication configuration profile that is used to determine one or more databases of the plurality of target databases to store selected tenant data of the source database to be replicated, wherein the source database replication configuration profile includes a number of idle connections, a number of currently available connections, and a number of connections released, to retrieve from each of the plurality of target databases, a target database replication configuration profile that includes a number of total available connections, a number of idle connections, and a connection timeout time, to determine any corrupted values of the retrieved target database replication configuration profiles, to provide a value for any of the determined corrupted values, to transform the retrieved target database replication configuration profiles to persist in a management platform database that is communicatively coupled to the server of the platform management service, to transform the selected tenant data to remove underlying database specific parameters that are different from tenant data and are for a type or version of a database before replicating the selected tenant data, to compare the retrieved source database replication configuration profile and the target database replication configuration profiles to determine which target databases are usable to replicate the transformed selected tenant data to, to classify the target database replication configuration profiles based on results of the comparison of the source database replication configuration profile and the target database replication configuration profiles, and to generate a list of one or more target databases of the plurality of target databases for the transformed selected tenant data of the source database to be replicated to based on the classification of the target database replication configuration profiles.

11. The system of claim 10, wherein the server of the management platform service retrieves a latency of a transport layer and a transmission rate performance of the plurality of target databases, and generates the list of one or more target databases of the plurality of target databases is based on the retrieved latency of the transport layer and the transmission rate performance of the plurality of target databases.

12. The system of claim 10, wherein the server of the management platform service retrieves the target database replication configuration profile by deploying a replication agent to retrieve the target database replication configuration profile for each of the plurality of target databases.

13. The system of claim 10, wherein the server of the management platform service retrieves the target database replication configuration profiles from each the plurality of target databases by cleaning any missing values of the target database replication configuration profiles by providing a value for the missing value or removing the missing value, and persisting the cleaned target database replication configuration profiles in the management platform database.

14. The system of claim 10, wherein the server of the management platform service transforms the generated list of one or more target databases of the plurality of target databases for the transformed selected tenant data to be replicated to.

15. The system of claim 10, wherein the server of the management platform service automatically selects a first-listed target database in the generated list of the one or more databases to be used for the replication of the transformed selected tenant data, and replicates the transformed selected tenant data from the source database to the selected first-listed target database.

16. The system of claim 10, wherein the server of the management platform service receives a selection of a target database from the generated list of the one or more databases to be used for the replication of the transformed selected tenant data, and replicates the selected tenant data from the source database to the selected target database.

17. The system of claim 10, wherein the source database replication configuration profile includes at least one from the group consisting of: database name, database vendor, server cloud provider, server cloud vendor, storage allocation amount, storage type, archived logs, transactional logs, page size, read IOPs (input/output operations per second), write IOPs, projected time for completion of replication, data size of the tenant data to be replicated, total row count of the tenant data to be replicated, and total table count of the tenant data to be replicated.

18. The system of claim 10, wherein the target database replication configuration includes at least one from the group consisting of: projected storage allocation amount, projected storage type, archived logs, transactional logs, projected page size, projected tenant IOPs (input/output operations per second), projected tenant datasize, projected tenant row count, and projected tenant table count.

* * * * *